United States Patent

Yamaoka et al.

(10) Patent No.: US 10,295,981 B2
(45) Date of Patent: May 21, 2019

(54) ENGINEERING TOOL (71) Applicant: Mitsubishi Electric Corporation, Tokyo (JP)

(72) Inventors: Takayuki Yamaoka, Tokyo (JP); Hiroshi Hamazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 15/529,131

(22) PCT Filed: Feb. 12, 2016

(86) PCT No.: PCT/JP2016/054190
§ 371 (c)(1),
(2) Date: May 24, 2017

(87) PCT Pub. No.: WO2017/138156
PCT Pub. Date: Aug. 17, 2017

(65) Prior Publication Data
US 2018/0059634 A1 Mar. 1, 2018

(51) Int. Cl.
*G05B 19/042* (2006.01)
*G05B 19/05* (2006.01)
*G06F 3/0484* (2013.01)

(52) U.S. Cl.
CPC ....... *G05B 19/0426* (2013.01); *G05B 19/054* (2013.01); *G05B 2219/13052* (2013.01);
(Continued)

(58) Field of Classification Search
CPC .............. G05B 19/0426; G05B 19/054; G05B 2219/13052; G05B 2219/24034; G06F 3/0484; G06F 2203/04803
See application file for complete search history.

(56) References Cited

U.S. PATENT DOCUMENTS 6,301,508 B1 * 10/2001 Matsuura ........... G05B 19/0426
700/20
8,712,557 B2 * 4/2014 Terae ................... G05B 19/056
700/17
(Continued)

FOREIGN PATENT DOCUMENTS

CN 105074594 A 11/2015
JP 7-072787 A 3/1995
(Continued)

OTHER PUBLICATIONS

Decision to Grant a Patent for Japanese Patent Application No. 2016-567885, dated Mar. 14, 2017.
(Continued)

*Primary Examiner* — Stephen W Smoot
(74) *Attorney, Agent, or Firm* — Sughrue Mion, PLLC; Richard C. Turner (57) ABSTRACT

An engineering tool includes a display area to display a ladder program, the display area being displayed on a display screen of a display device; and a cell, which is a temporal-operator imparted region. The cell, which is a temporal-operator imparted region, is a region that is displayed in the display area and in which a temporal operator is imparted to a program module of the ladder program. The engineering tool includes a control specification editing unit and a control-specification-descriptive-expression converting unit. The control specification editing unit creates the program module. The control-specification-descriptive-expression converting unit converts the program module into a mathematical expression that can be input to a model checking program.

4 Claims, 7 Drawing Sheets

(52) U.S. Cl.
CPC .. *G05B 2219/24034* (2013.01); *G06F 3/0484* (2013.01); *G06F 2203/04803* (2013.01)

(56) References Cited

U.S. PATENT DOCUMENTS

| | | | |
|---|---|---|---|
| 9,471,056 B2* | 10/2016 | Itakura | G05B 19/409 |
| 10,001,767 B2 | 6/2018 | Takehisa | |
| 2005/0033457 A1 | 2/2005 | Yamane | |
| 2009/0182442 A1 | 7/2009 | Sethuraman et al. | |
| 2012/0185233 A1* | 7/2012 | Albrecht | G05B 19/058 |
| | | | 703/22 |
| 2016/0085226 A1 | 3/2016 | Tanaka | |
| 2016/0170397 A1 | 6/2016 | Takehisa | |
| 2016/0370781 A1* | 12/2016 | Kudo | G05B 19/0426 |

FOREIGN PATENT DOCUMENTS

| | | |
|---|---|---|
| JP | 10-063537 A | 3/1998 |
| JP | 2002-182709 A | 6/2002 |
| JP | 2005-063425 A | 3/2005 |
| JP | 2009-277135 A | 11/2009 |
| TW | 201546585 A | 12/2015 |

OTHER PUBLICATIONS

International Search Report of PCT/JP2016/054190, dated May 10, 2016. [PCT/ISA/210].

Communication dated May 28, 2018, from the State Intellectual Property Office of People's Republic of China in counterpart Application No. 201680003809.7.

Office Action dated Feb. 22, 2019 in Chinese Application No. 201680003809.7.

\* cited by examiner

```
MODOLE main
VAR
  D0 : 0..9;  D1 : 0..9;  D2 : 0..9;
ASSIGN
  Init(D0) := 0;  Init(D1) := 0;  Init(D2) := 0;
next(D0) := case
        D0 < 9 : D0 + 1; D0 = 9 : 0; 1 : D0;
        esac;
next(D1) := case
        D1 < 9 & D0 = 9 : D1 + 1; D1 = 9 & D0 = 9 : 0; 1 : D1;
        esac;
next(D2) := case
        D2 < 9 & D1 = 9 & D0 = 9 : D2 + 1; D2 = 9 & D1 = 9 & D0 = 9 : 0; 1 : D2;
        esac;
```

FIG.9

ENGINEERING TOOL

CROSS REFERENCE TO RELATED APPLICATIONS

This application is a National Stage of International Application No. PCT/JP2016/054190 filed Feb. 12, 2016, the contents of all of which are incorporated herein by reference in their entirety.

FIELD

The present invention relates to an engineering tool that creates a control program.

BACKGROUND

An operation check is performed on a control program by using a conventional engineering tool while the engineering tool is connected to the actual control-target device or a simulator. The operation check is generally performed using a technique where, while the control program to be checked is executed, a user monitors and checks the situation of the control program. Further, during the operation check, setting the initial values of the control program and setting parameters during execution are performed by the user entering and setting them.

With the above conventional method, there is a problem in that, in order to execute and check the control program, the user has multiple tasks and therefore the conventional method is time-consuming. Further, with the above method, the user needs to set initial values and parameters during execution beforehand in order to exhaustively check operations, and it takes time to create the initial values and parameters.

In response to the problems with the above conventional method, a device has been proposed that performs the operation check on a control program by using a model checking program (see Patent Literature 1).

CITATION LIST

Patent Literature

Patent Literature 1: Japanese Patent Application Laid-open Publication No. H07-72787

SUMMARY

Technical Problem

However, with the device described in Patent Literature 1, a method of inputting a control specification that defines the operations to be performed by a control-target device and operations not to be performed by a control-target device is not disclosed. Thus, with the device described in Patent Literature 1, a method needs to be devised of inputting a control specification in order to perform the operation check using a model checking program.

The present invention is made in view of the above, and an object thereof is to provide an engineering tool that can easily input a control specification of a control-target device.

Solution to Problem

In order to solve the above problem and achieve the object, as aspect of the present invention provides an engineering tool that includes a display area that is displayed on a display screen of a display device and that displays control specification descriptive expressions, and a temporal-operator imparted region. The temporal-operator imparted region is a region that is displayed in the display area and in which a temporal operator is imparted to a program module of the control specification descriptive expression.

Advantageous Effects of Invention

The engineering tool according to the present invention produces an effect of being able to easily input a control specification of a control-target device.

DESCRIPTION OF EMBODIMENTS

An engineering tool according to an embodiment of the present invention will be described in detail below with reference to the drawings. Note that this embodiment is not intended to limit the present invention.

First Embodiment

Figure 1:
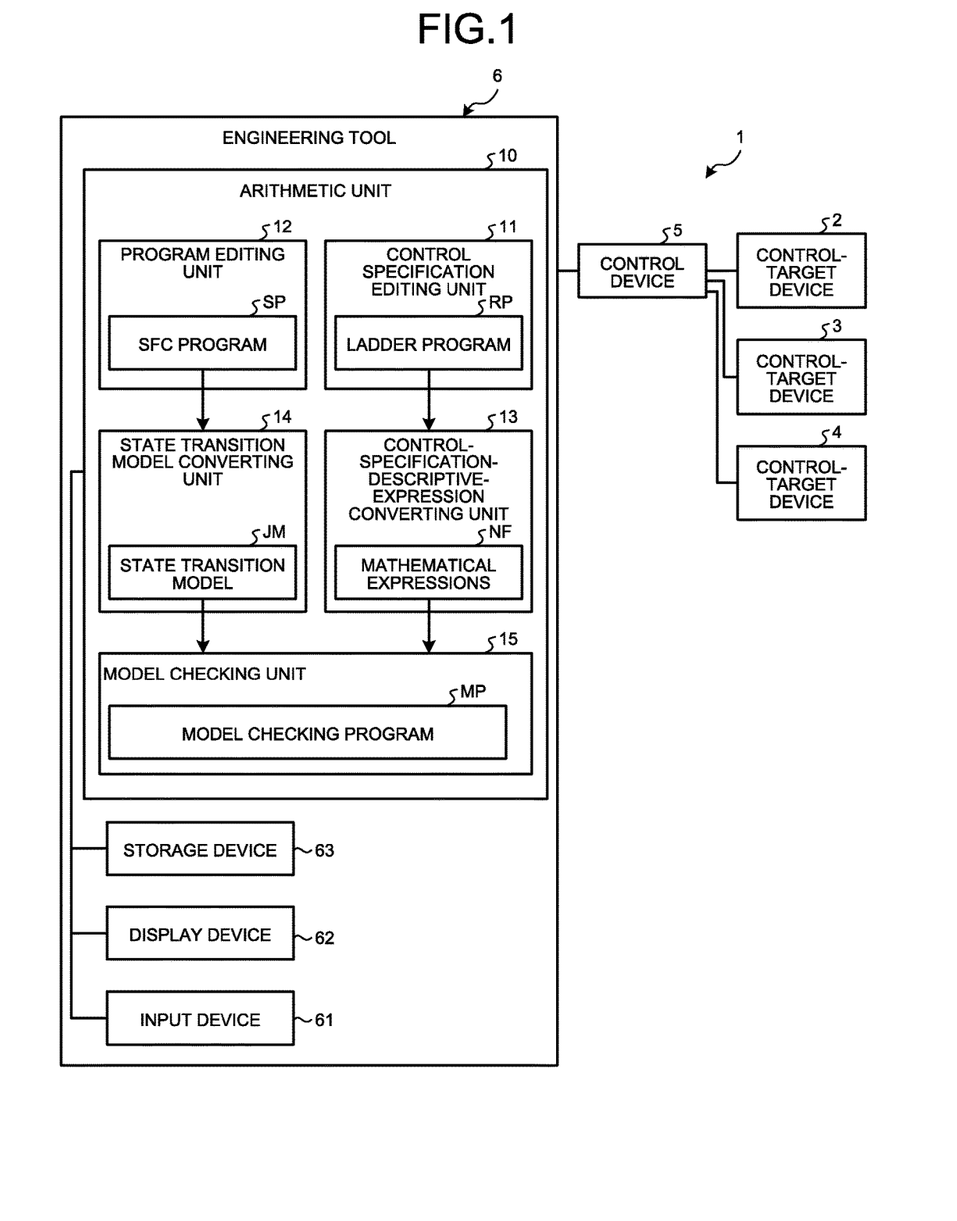
FIG. 1 is a diagram illustrating the configuration of a control system that includes an engineering tool according to a first embodiment.
Figure 2:
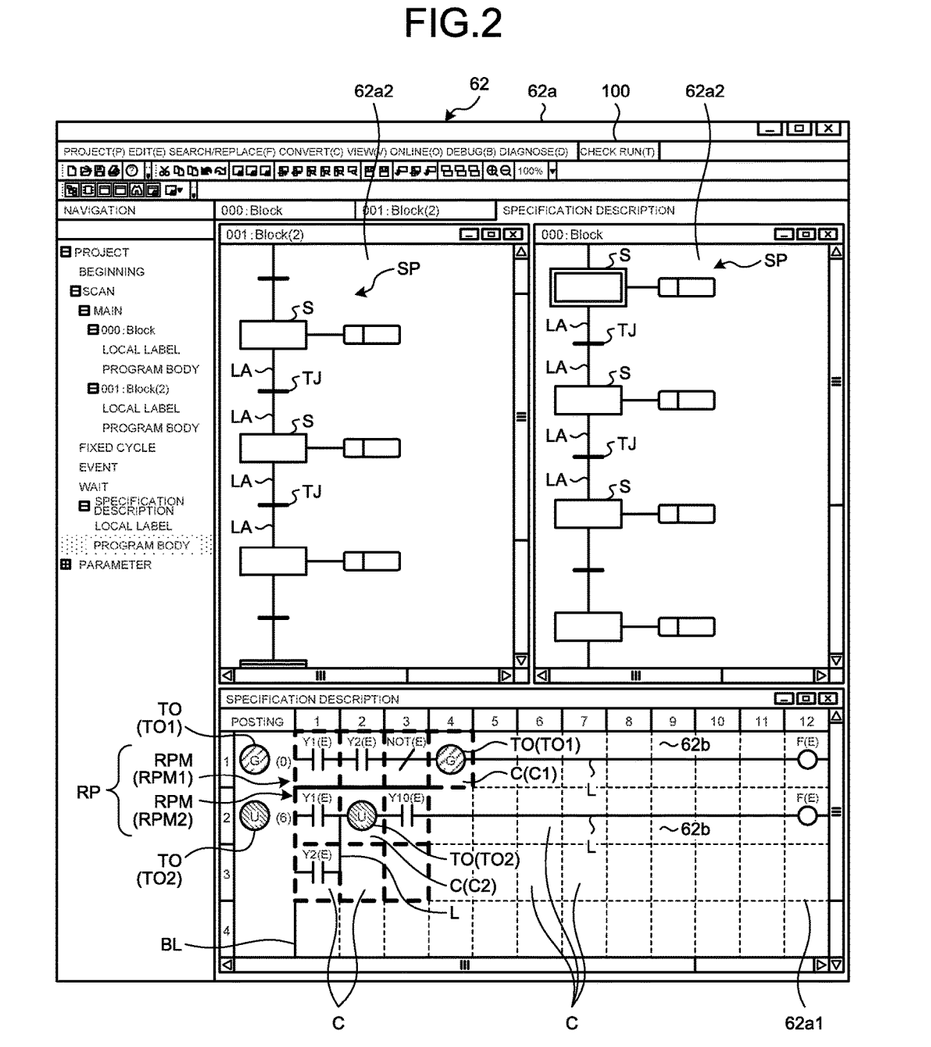
FIG. 2 is a diagram illustrating an example display screen of a display device of the engineering tool illustrated in FIG. 1.

FIG. 1 is a diagram illustrating the configuration of a control system that includes an engineering tool according to the first embodiment. FIG. 2 is a diagram illustrating an example display screen of a display device of the engineering tool illustrated in FIG. 1. The control system 1 is a constitute of a facility in the field of FA (Factory Automation). As illustrated in FIG. 1, the control system 1 includes a plurality of control-target devices 2, 3, and 4 installed in the facility; a control device 5 connected to the control-target devices 2, 3, and 4; and an engineering tool 6 connected to the control device 5. The control-target devices 2, 3, and 4 are switches, adjusting valves, electromagnetic valves, motors, or pumps installed in the facility and are drive units that perform operations. Although, in the first embodiment, the control system 1 includes the three control-target devices 2, 3, and 4, it may include one, two, or more than three control-target devices or at least one control-target device 2, 3, or 4.

The engineering tool 6 is a computer that executes computer programs. The engineering tool 6 is connected to the control-target devices 2, 3, and 4 via the control device 5. The engineering tool 6 creates an SFC (Sequential Function Chart) program SP, which is a control program to be executed by the control device 5, and transmits it to the control device 5. The control device 5 executes the SFC program SP in order to control the control-target devices 2, 3, and 4. Although, in the first embodiment, the control device 5 is a programmable controller (JIS B 3502:2011; PLC), it is not limited to a PLC.

The engineering tool 6 is also a device that performs an operation check on the created SFC program SP. As illustrated in FIG. 1, the engineering tool 6 includes an input device 61, which accepts operation inputs from a user; and a display device 62 having a display screen 62a illustrated in FIG. 2, which displays text and images. The engineering tool 6 includes a storage device 63, which stores a control creating program for creating the SFC program SP, a model checking program MP for performing an operation check on the SFC program SP, and the created SFC program SP; and an arithmetic unit 10, which creates the SFC program SP and performs an operation check.

The control creating program, the SFC program SP, and the model checking program MP are computer programs that the engineering tool 6, which is a computer, can execute and are engineering tool programs. When the engineering tool 6 executes the control creating program, the display device 62 displays a first display area 62a1 and second display areas 62a2 on the display screen 62a as illustrated in FIG. 2. That is, the engineering tool 6 executes the control creating program to include the first display area 62a1 and the second display areas 62a2 displayed on the display screen 62a. The first display area 62a1 is a display area in which a ladder program RP, which is a control specification descriptive expression, is displayed. The ladder program RP is a ladder program written in ladder (LD) language. The ladder language is a language defined by IEC (International Electrotechnical Commission) 61131-3 and JIS (Japanese Industrial Standard) B 3503:2012. Although, in the first embodiment, the first display area 62a1 is displayed on the lower part of the display screen 62a, this is not a limitation. Although, in the first embodiment, the engineering tool 6 displays the ladder program RP as a control specification descriptive expression, what is displayed as the control specification descriptive expression is not limited to the ladder program RP.

In the first embodiment, the ladder program RP includes a bus line BL, which extends linearly in the vertical direction at the left end of the first display area 62a1 in FIG. 2, and a plurality of program modules RPM, which are connected to and intersect with the bus line BL and extend in the lateral direction in FIG. 2. In the first embodiment, the program modules RPM define the control specification of the control-target devices 2, 3, and 4. The control specification defines operations of the control-target devices 2, 3, and 4. The control specification describes operations that the control-target devices 2, 3, and 4 always perform, operations that the control-target devices 2, 3, and 4 are to perform in the future, or relations between timings when respective operations of the control-target devices 2, 3, and 4 are performed.

The program module RPM includes elements E that denote operations of the control-target devices 2, 3, and 4 and are arranged laterally or vertically in FIG. 2 and connecting lines L that connect the elements E with each other or connect the elements E and the bus line BL. The program module RPM defines the control specification of the control-target devices 2, 3, and 4 in accordance with the arrangement of the elements E and connection relations of the connecting lines L.

The second display area 62a2 is a display area in which the SFC program SP, which controls the control-target devices 2, 3, and 4, is displayed. Although, in the first embodiment, two second display areas 62a2 are displayed above the first display area 62a1 on the display screen 62a, this is not a limitation.

In the first embodiment, the SFC program SP includes steps S associated with operations of the control-target devices 2, 3, and 4; transitions TJ associated with the transition condition between the steps S; and connecting lines LA. In the SFC program SP, the steps S and the transitions TJ are arranged alternately in the vertical direction, and the connecting lines LA connect the steps S and the transitions TJ. In the SFC program SP, the operation associated with each step S is performed in order, starting from the highest step S among the steps S, and if the transition condition associated with the transition TJ that is connected via the connecting line LA to the step S being executed is satisfied, the operation associated with the step S being executed is stopped. In the SFC program SP, the operation associated with the step S connected via the connecting line LA to the transition TJ whose transition condition has been satisfied is then performed.

The arithmetic unit 10 includes a control specification editing unit 11, which is a first creating unit, and a program editing unit 12, which is a second creating unit as illustrated in FIG. 1. The arithmetic unit 10 includes a control-specification-descriptive-expression converting unit 13, which is a first converting unit, a state transition model converting unit 14, which is a second converting unit, and a model checking unit 15.

The program editing unit 12 executes the control creating program to create the SFC program SP according to the operation inputs accepted by the input device 61. Although, in the first embodiment, the program editing unit 12 creates the SFC program SP, a program to be created is not limited to the SFC program. A program may be created in ladder language or ST (Structured Text) language. The ST language is a language defined by IEC 61131-3. The program editing unit 12 displays the steps S, the transitions TJ, and the connecting lines LA accepted by the input device 61 in the second display area 62a2 of the display screen 62a of the display device 62. When the input device 61 accepts an operation input to determine the SFC program SP displayed in the second display area 62a2, the program editing unit 12 stores the created SFC program SP in the storage device 63.

The state transition model converting unit 14 converts the SFC program SP into a state transition model JM, which is a code that can be input to the model checking program MP. The state transition model converting unit 14 converts the output source code of the SFC program SP stored in the storage device 63 and displayed in the second display area 62a2 into the state transition model JM, which can be input to the model checking program MP. The state transition model converting unit 14 executes a program to convert the SFC program SP into a machine language or a code of a lower level than the SFC program SP, i.e., what is called a compiler.

Figure 3:
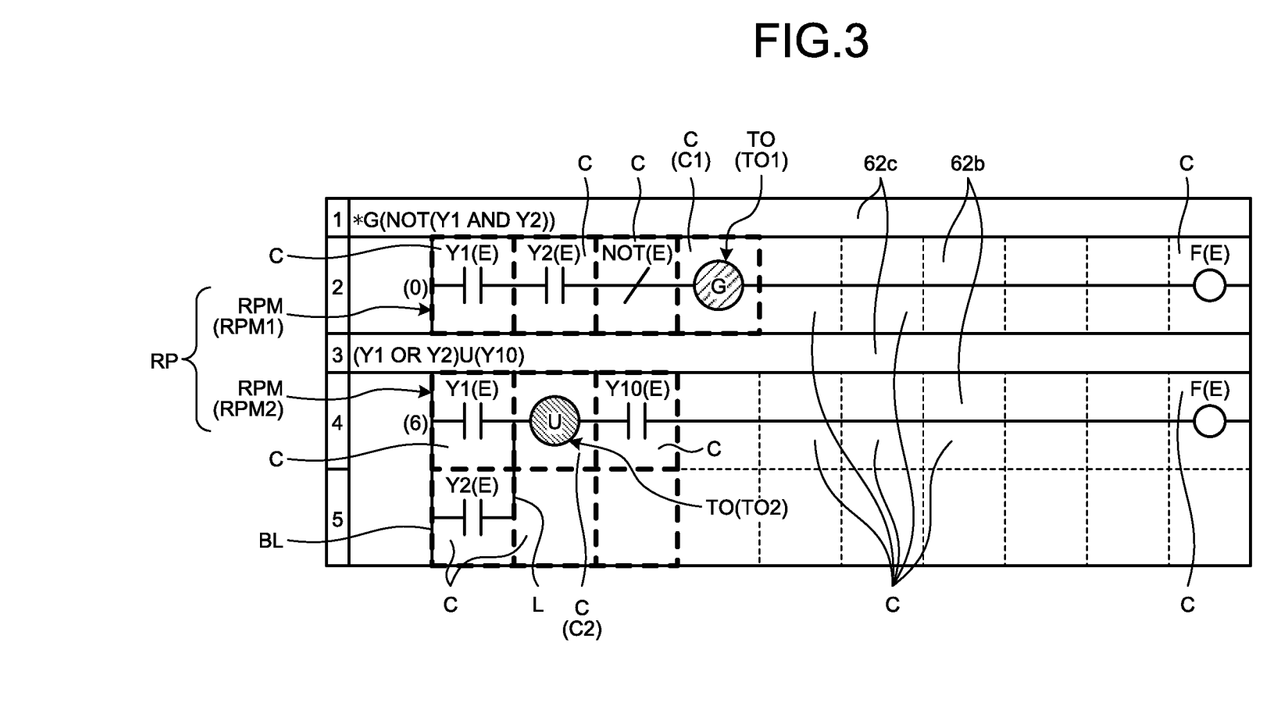
FIG. 3 is a diagram illustrating an example ladder program displayed in a first display area of the display screen of the display device of the engineering tool illustrated in FIG. 1.
Figure 4:
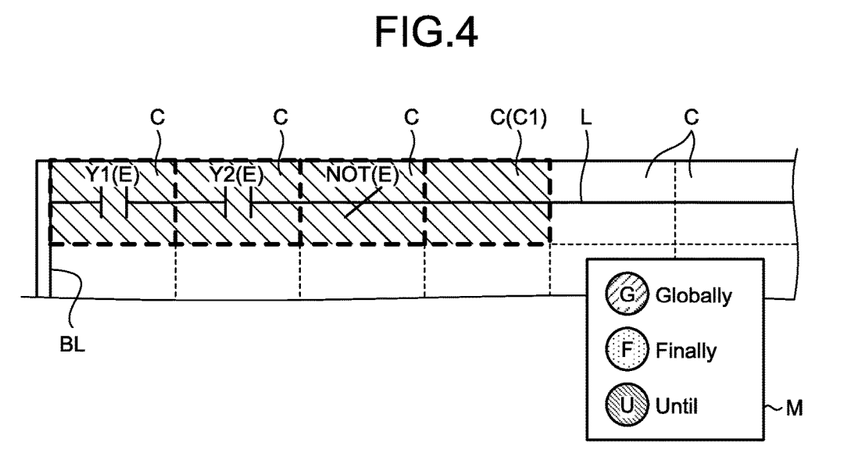
FIG. 4 is a diagram illustrating the process of creating a first program module of the ladder program illustrated in FIG. 3.
Figure 5:
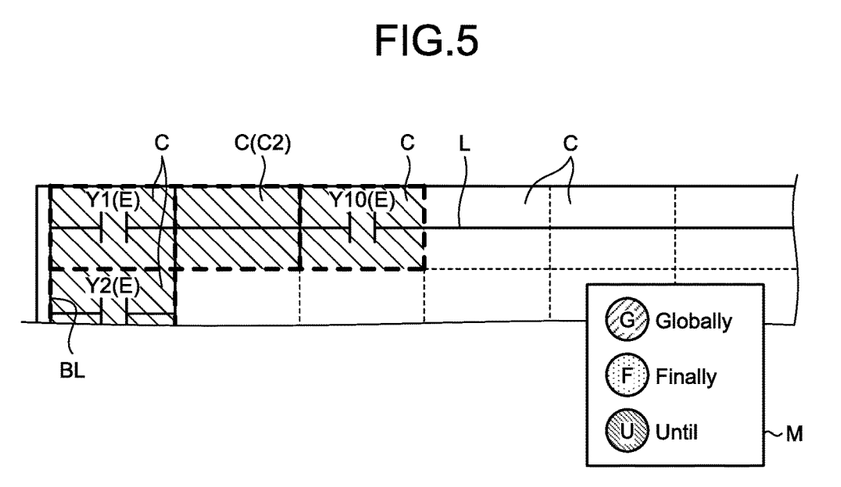
FIG. 5 is a diagram illustrating the process of creating a second program module of the ladder program illustrated in FIG. 3.

FIG. 3 is a diagram illustrating an example ladder program displayed in the first display area of the display screen of the display device of the engineering tool illustrated in FIG. 1. FIG. 4 is a diagram illustrating the process of creating the first program module of the ladder program illustrated in FIG. 3. FIG. 5 is a diagram illustrating the process of creating the second program module of the ladder program illustrated in FIG. 3.

The control specification editing unit 11 executes the control creating program to create the program modules RPM of the ladder program RP according to operation inputs accepted by the input device 61. The control specification editing unit 11 displays the elements E and the connecting lines L accepted by the input device 61 in the first display area 62a1 of the display screen 62a of the display device 62.

The first display area 62a1 includes program display areas 62b for displaying the program modules RPM that are constituents of the ladder program RP and control specification display areas 62c for displaying the control specification, as illustrated in FIG. 3. The control specification displayed in the control specification display area 62c is one that is defined by the program module RPM displayed in the program display area 62b. The program display areas 62b and the control specification display areas 62c correspond one-to-one to each other, and the program display area 62b and the control specification display area 62c that correspond to each other are arranged vertically in the first display area 62a1. In the first embodiment, each program display area 62b of the first display area 62a1 is composed of a plurality of cells C surrounded by thick dashed grid lines in FIG. 3. Each cell C displays the element E or the connecting line L according to an operation input accepted by the input device 61. The connecting lines L are displayed also at boundaries between the cells C. Hereinafter, the program module RPM displayed in the upper part of FIG. 3 is referred to as a first program module RPM1, and the program module RPM displayed in the lower part of FIG. 3 is referred to as a second program module RPM2.

The program display area 62b displaying the first program module RPM1 displays "Y1", "Y2", and "NOT" connected in series in the order they appear in this sentence from the left-end cell C toward the right-side cell C as the elements E. The cell C on the right of the cell C displaying "NOT" as the element E in the program display area 62b displaying the first program module RPM1 is a first temporal-operator imparted region in which a first temporal operator TO is imparted to the first program module RPM1. The cell C that is the first temporal-operator imparted region is hereinafter indicated by a reference symbol C1. The cell C1 is displayed in the first display area 62a1 and displays the first temporal operator TO in order to impart the first temporal operator TO to the first program module RPM1.

The program display area 62b displaying the second program module RPM2 displays "Y1", the connecting line L, and "Y10" connected in series in the order they appear in this sentence from the left-end cell C toward the right-side cell C as the elements E. The program display area 62b displaying the second program module RPM2 displays "Y2" in the cell C under the cell C displaying "Y1" as the element E. "Y2" as the element E is connected by the connecting line L in parallel with "Y1" as the element E.

The cell C between the cell C displaying "Y1" as an element in the program display area 62b displaying the second program module RPM2 and the cell C displaying "Y10" as an element is a second temporal-operator imparted region in which a second temporal operator TO, which is different from the first temporal operator TO, is imparted to the second program module RPM2. The cell C that is the second temporal-operator imparted region is hereinafter indicated by a reference symbol C2. The cell C2 is displayed in the first display area 62a1 and displays the second temporal operator TO in order to impart the second temporal operator TO to the second program module RPM2. Hereinafter, if the first temporal operator TO is distinguished among the first temporal operator TO and the second temporal operator TO, a reference symbol 101 is used to denote it, and if the second temporal operator TO is distinguished, a reference symbol TO2 is used to denote it. If the first temporal operator TO and the second temporal operator TO are not distinguished, the reference symbol TO is used to denote them. As such, the cells C, C1, and C2 that are constituents of the program display areas 62b of the first display area 62a1 display the temporal operators TO as well as the elements E and the connecting lines L in accordance with operation inputs accepted by the input device 61.

The first temporal operator TO1 and the second temporal operator TO2 define when the elements E of the ladder program RP become true. In the first embodiment, the first temporal operator TO1 is "G" (Globally), which indicates that "Y1" as the element E, "Y2" as the element E, and "NOT" as the element E, which are connected, are always true. That is, the first temporal operator TO1 signifies operations of the control-target devices 2, 3, and 4 that are always true, i.e., operations that the control-target devices 2, 3, and 4 always perform.

In the first embodiment, the first program module RPM1 illustrates that "Y1" as the element E and "Y2" as the element E are not true simultaneously. The second temporal operator TO2 is "U" (Until), which indicates that "Y1" as the element E or "Y2" as the element E placed on the left of the second temporal operator TO2 is true until "Y10" as the element E placed on the right of the second temporal operator TO2 becomes true. The second program module RPM2 illustrates that "Y1" as the element E or "Y2" as the element E is true until "Y10" as the element E becomes true. That is, the second temporal operator TO2 indicates the relation between timings when respective operations of the control-target devices 2, 3, and 4 are performed.

Although, in the first embodiment, the engineering tool 6 uses "G" and "U" as the temporal operators TO, they are not limited to these. The engineering tool 6 may use "F" (Finally), which indicates that the element E is true at some moment, and "X" (Next), which indicates that the element E is true at the next moment, as well as "G" and "U". "F" as the temporal operator TO is a temporal operator that signifies operations of the control-target devices 2, 3, and 4 that are true in the future, i.e., operations that the control-target devices 2, 3, and 4 are to perform in the future. "X" as the temporal operator TO is a temporal operator that indicates the relation between timings when operations of the control-target devices 2, 3, and 4 are performed.

The control specification editing unit 11 creates the first program module RPM1 and the second program module RPM2 as below. The control specification editing unit 11 displays the elements E and the connecting lines L accepted by the input device 61 in the cells C forming the first display area 62a1. The control specification editing unit 11 inputs the temporal operators TO1 and TO2 into the particular cells C1 and C2 among the cells C forming the first display area 62a1 as follows. The input device 61 accepts the selection of one or more cells C in which the temporal operator TO is to be imparted from among the cells C forming the first program module RPM1 and the second program module RPM2. In FIGS. 4 and 5, the one or more cells C in which the temporal operators TO are to be imparted are indicated by oblique hatching. Then, when the input device 61 accepts the input of the temporal operators into the particular cells C1 and C2 surrounded by thick dashed lines among the one or more cells C in which the temporal operators TO are to be imparted, a menu M displaying the temporal operators TO that can be input is displayed next to the selected cells C1 and C2 as illustrated in FIGS. 4 and 5. When the input device 61 accepts the selection of one of the temporal operators TO displayed in the menu M, the control specification editing unit 11 displays the selected temporal operator TO in the selected cell C1 or C2.

In the first embodiment, "G", which is the first temporal operator TO1, is input to the particular cell C1 illustrated in FIG. 4 to create the first program module RPM1. "U", which is the second temporal operator TO2, is input to the particular cell C2 illustrated in FIG. 5 to create the second program module RPM2.

The control specification editing unit 11 creates annunciators F for displaying the results in predetermined cells C among the cells C forming the first program module RPM1 and the second program module RPM2. The annunciators F for displaying the results indicate whether the SFC program SP satisfies the control specification defined by the first program module RPM1 and the second program module RPM2. In the first embodiment, the control specification editing unit 11 creates the annunciators F for displaying the results in the cells C at the right ends of the first program module RPM1 and the second program module RPM2, as illustrated in FIG. 2. When the input device 61 accepts an operation input to determine the ladder program RP displayed in the first display area 62$a$1, the control specification editing unit 11 stores the created ladder program RP in the storage device 63. Although, in the first embodiment, the control specification editing unit 11 imparts the first temporal operator 101 to the cell C1 and imparts the second temporal operator TO2 to the cell C2, the temporal operator TO may be imparted to any cell C. The control specification editing unit 11 imparts the temporal operator TO to any cell C specified by the user among the cells C that are constituents of the program modules RPM1 and RPM2. That is, the first temporal-operator imparted region C1 is any cell C specified by the user among the cells C that are constituents of the first program module RPM1, and the second temporal-operator imparted region C2 is any cell C specified by the user among the cells C that are constituents of the second program module RPM2.

Further, in the first embodiment, when the input device 61 accepts an operation input to determine the ladder program RP displayed in the first display area 62$a$1, the control specification editing unit 11 displays, in the first display area 62$a$1, the temporal operators TO1 and TO2, which are displayed in the program modules RPM1 and RPM2 of the ladder program RP, such that they correspond to the program modules RPM1 and RPM2 respectively. In the first embodiment, the control specification editing unit 11 displays the temporal operators TO1 and TO2, which are displayed in the program modules RPM1 and RPM2, on the left side of the program modules RPM1 and RPM2 of the first display area 62$a$1.

The control-specification-descriptive-expression converting unit 13 converts the first program module RPM1 and the second program module RPM2 of the ladder program RP into mathematical expressions NF, which can be input to the model checking program MP. The control-specification-descriptive-expression converting unit 13 converts the program modules RPM1 and RPM2 of the ladder program RP stored in the storage device 63 and displayed in the first display area 62$a$1 into the mathematical expressions NF, which can be input to the model checking program MP. The control-specification-descriptive-expression converting unit 13 executes a program to convert the first program module RPM1 and the second program module RPM2 of the ladder program RP into a machine language or a code of a lower level than the ladder program RP, i.e., what is called a compiler.

In the first embodiment, the control-specification-descriptive-expression converting unit 13 converts the first program module RPM1 into the mathematical expression NF given by the following expression 1 and converts the second program module RPM2 into the mathematical expression NF given by the following expression 2.

$$G(NOT(Y1 \text{ AND } Y2)) \qquad \text{Ex. 1}$$

$$(Y1 \text{ OR } Y2)U(Y10) \qquad \text{Ex. 2}$$

The model checking unit 15 executes the model checking program MP stored in the storage device 63 to determine whether the SFC program SP created by the user satisfies the program modules RPM1 and RPM2, which define the control specification of the ladder program RP. The model checking unit 15 displays the determination result indicating whether the SFC program SP satisfies the program modules RPM1 and RPM2 in the annunciators F of the program modules RPM1 and RPM2 of the first display area 62$a$1. The engineering tool 6 uses a NuSMV (new symbolic model checker) or SPIN model checker as the model checking program MP, but it is not limited to these.

When accepting an operation input to execute the control creating program from the input device 61, the engineering tool 6 according to the first embodiment displays the first display area 62$a$1 and the second display areas 62$a$2 on the display screen 62$a$ of the display device 62. With the engineering tool 6, the program editing unit 12 displays, in the second display areas 62$a$2, the SFC programs SP according to operation inputs accepted from the input device 61. With the engineering tool 6, when the input device 61 accepts an operation input to determine the SFC programs SP displayed in the second display areas 62$a$2, the program editing unit 12 stores the determined SFC programs SP in the storage device 63, and the state transition model converting unit 14 converts the SFC programs SP into the state transition model JM.

With the engineering tool 6, the control specification editing unit 11 displays, in the first display area 62$a$1, the ladder program RP according to operation inputs accepted from the input device 61. With the engineering tool 6, when the input device 61 accepts an operation input to determine the ladder program RP displayed in the first display area 62$a$1, the control specification editing unit 11 stores the determined ladder program RP in the storage device 63, and the control-specification-descriptive-expression converting unit 13 converts the program modules RPM1 and RPM2 of the ladder program RP into mathematical expressions NF.

With the engineering tool 6, when the input device 61 accepts an operation input of a check run area 100 to run the operation check on the SFC programs SP illustrated in FIG. 2, the model checking unit 15 determines whether the SFC programs SP created by the user satisfy the program modules RPM1 and RPM2 of the ladder program RP. With the engineering tool 6, the model checking unit 15 displays the determination result in the annunciators F of the program modules RPM1 and RPM2.

Figure 6:
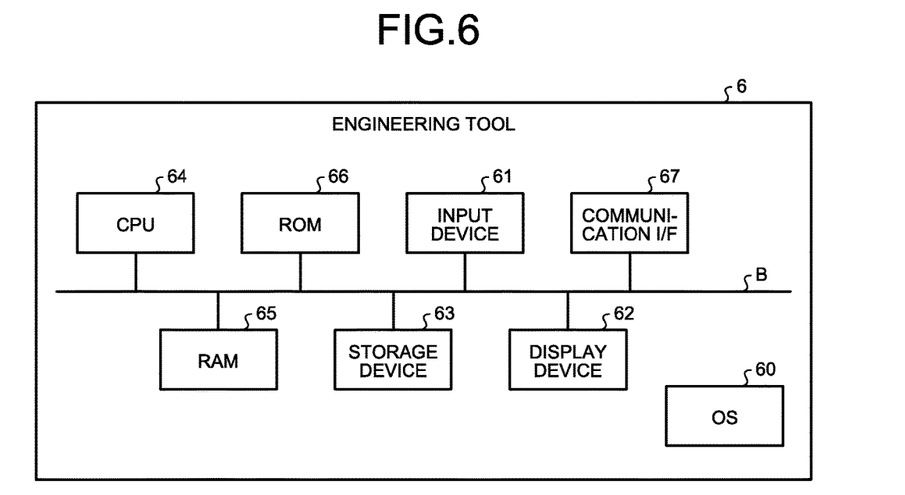
FIG. 6 is a diagram illustrating the hardware configuration of the engineering tool according to the first embodiment.

FIG. 6 is a diagram illustrating the hardware configuration of the engineering tool according to the first embodiment. The engineering tool 6 according to the first embodiment is a computer that executes computer programs to run on an OS (Operating System) 60 and includes a CPU (Central Processing Unit) 64, a RAM (Random Access Memory) 65, a ROM (Read Only Memory) 66, and a communication interface 67 in addition to the input device 61, the display device 62, and the storage device 63, as illustrated in FIG. 6. The CPU 64, the RAM 65, the ROM 66, the storage device 63, the input device 61, the display device 62, and the communication interface 67 are connected via a bus B.

The functions of the control specification editing unit 11, the program editing unit 12, the control-specification-descriptive-expression converting unit 13, the state transition model converting unit 14, and the model checking unit 15 of the arithmetic unit 10 are realized by the CPU 64 executing programs stored in the ROM 66 and the storage device 63 while using the RAM 65 as a work area. The programs are realized by software, firmware, or a combination of software and firmware. The program stored in the ROM 66 is a BIOS (Basic Input Output System) or a UEFI (Unified Extensible Firmware Interface) but it is not limited to the BIOS or UEFI. In the first embodiment, the programs stored in the storage device 63 are an operating system program, the control creating program, the SFC program SP, and the model checking program MP, but they are not limited to the operating system program, the control creating program, the SFC program SP, and the model checking program MP. In the first embodiment, the storage device 63 is an SSD (Solid State Drive) or a HDD (Hard Disk Drive) but it is not limited to an SSD or HDD.

The input device 61 accepts operation inputs from the user. In the first embodiment, the input device 61 is a keyboard or a mouse but is not limited to a keyboard or a mouse. The display device 62 displays text and images. In the first embodiment, a liquid crystal display is cited as an example of the display device 62. The communication interface 67 communicates with the control device 5. The communication interface 67 is connected to the control device 5; therefore, the engineering tool 6 is connected to the control-target devices 2, 3, and 4.

Figure 7:
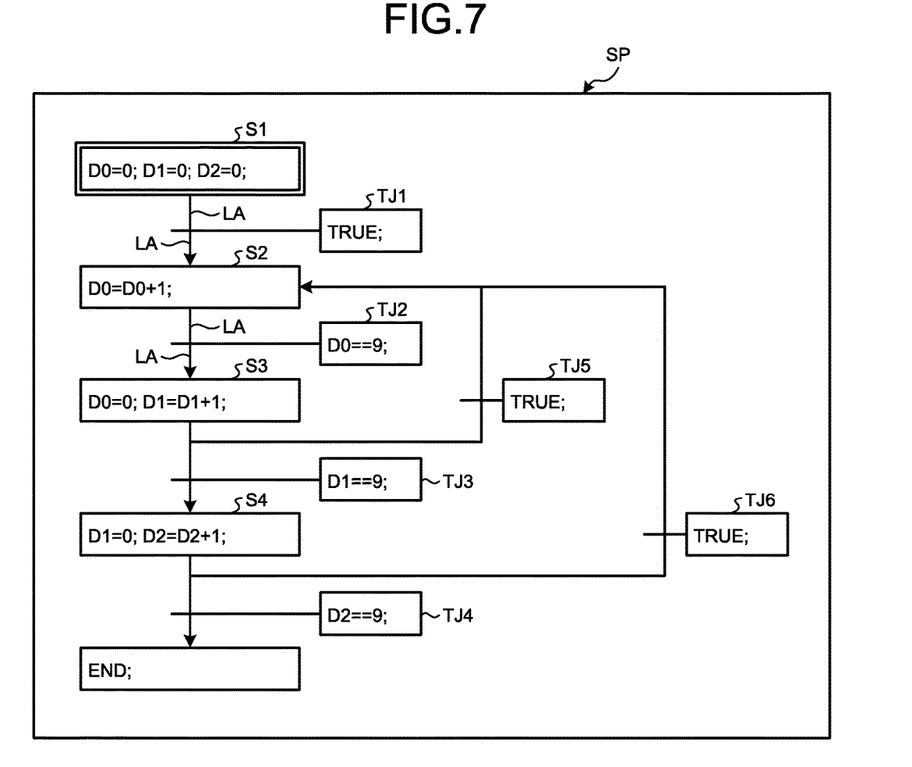
FIG. 7 is a chart illustrating an example SFC program created by the engineering tool according to the first embodiment.
Figure 8:
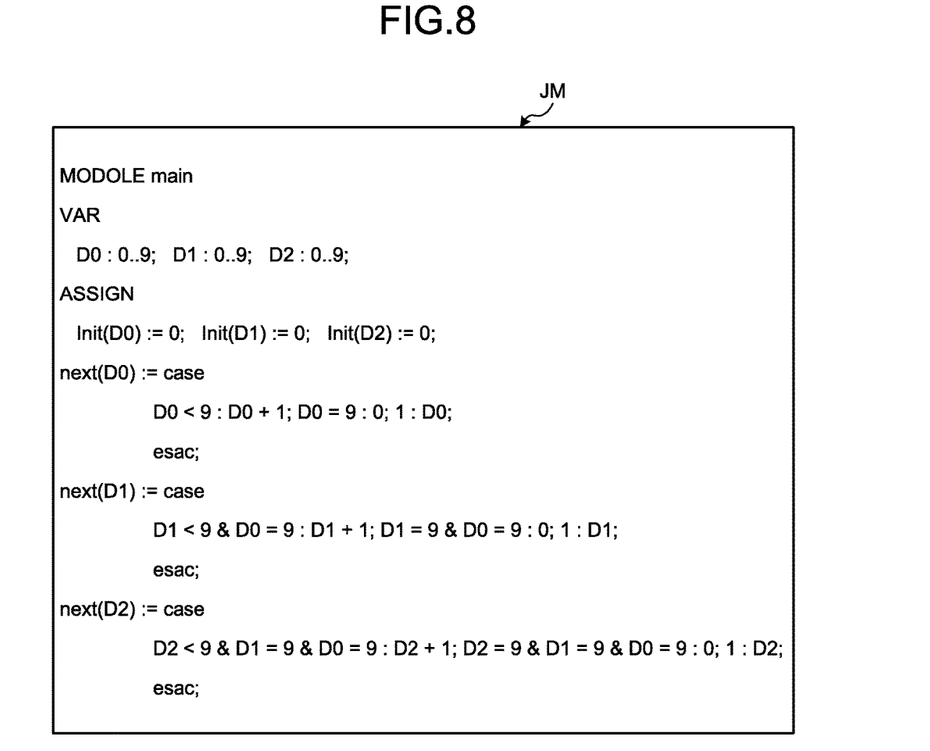
FIG. 8 is a list illustrating a state transition model obtained by converting the output program source code of the SFC program illustrated in FIG. 7.
Figure 9:
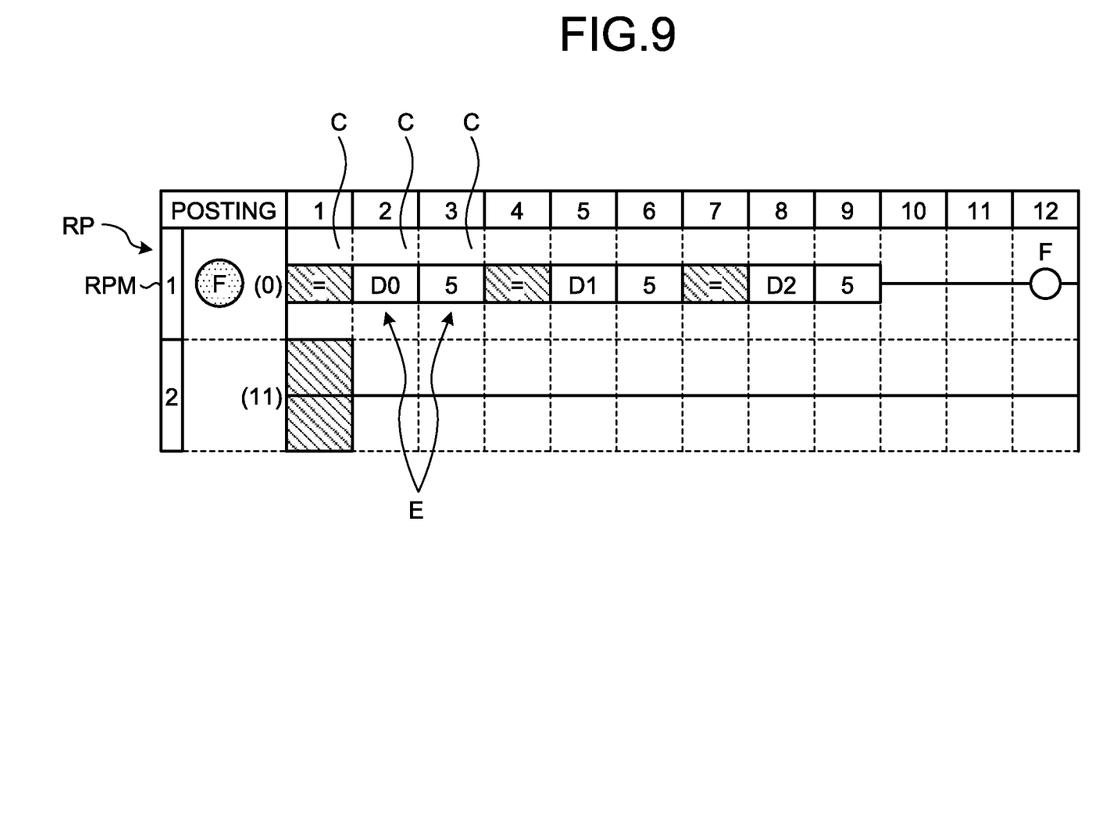
FIG. 9 is a diagram illustrating an example ladder program used in an operation check on the SFC program illustrated in FIG. 7.

Next, an example of the operation of the engineering tool 6 according to the first embodiment will be described using an example SFC program SP created by the engineering tool 6. FIG. 7 is a chart illustrating an example SFC program created by the engineering tool according to the first embodiment. FIG. 8 is a list illustrating a state transition model obtained by converting the output program source code of the SFC program illustrated in FIG. 7. FIG. 9 is a diagram illustrating an example ladder program used in the operation check of on the SFC program illustrated in FIG. 7.

With the engineering tool 6, the program editing unit 12 accepts operation inputs from the input device 61 and executes the control creating program; therefore, the SFC program SP illustrated in FIG. 7 is created. The SFC program SP illustrated in FIG. 7 increments the number by 1 from its value of 000 and finishes when the number has reached a value of 999, and the SFC program includes step S1 where, as the initial values, D0, which represents the digit in the units place, is set to 0, D1, which represents the digit in the tens place, is set to 0, and D2, which represents the digit in the hundreds place, is set to 0, and a transition TJ1 where transition is always made from step S1 to step S2. At step S2, the SFC program SP increments D0 by one until a transition TJ2 designating D0=9 is satisfied, and transitions to step S3 when the transition TJ2 designating D0=9 is satisfied.

At step S3, the SFC program SP sets D0 to 0 and increments D1 by 1 and returns to step S2 until a transition TJ3 designating D1=9 is satisfied, and steps S2 and S3 are repeated until the transition TJ3 is satisfied. When the transition TJ3 designating D1=9 is satisfied, the SFC program SP transitions to step S4. At step S4, the SFC program SP increments D2 by one and returns to step S2 until a transition TJ4 designating D2=9 is satisfied, and steps S2, S3, and S4 are repeated until the transition TJ4 is satisfied. When the transition TJ4 designating D2=9 is satisfied, the SFC program SP ends. Further, the SFC program SP illustrated in FIG. 7 includes a transition TJ5 for always returning from step S3 to step S2 until the transition TJ3 is satisfied and a transition TJ6 for always returning from step S4 to step S2 until the transition TJ4 is satisfied.

With the engineering tool 6, when the SFC program SP illustrated in FIG. 7 is determined, the state transition model converting unit 14 converts the output program source code of the SFC program SP into the state transition model JM illustrated in FIG. 8.

With the engineering tool 6, the control specification editing unit 11 accepts operation inputs from the input device 61 and executes the control creating program; therefore, the ladder program RP illustrated in FIG. 9 is created. The ladder program RP illustrated in FIG. 9 includes only a program module that designates that the number reaches 555 at some moment, i.e., that D0=5, D1=5, and D2=5 are satisfied.

With the engineering tool 6, when the ladder program RP illustrated in FIG. 9 is determined, the control-specification-descriptive-expression converting unit 13 converts the ladder program RP into the mathematical expression NF given by the following expression 3.

$$F(D0=5 \& D1=5 \& D2=5) \qquad \text{Ex. 3}$$

When accepting an operation input to run a check, the engineering tool 6 displays, in the annunciator F of the ladder program illustrated in FIG. 9, that the SFC program SP satisfies the ladder program RP.

The engineering tool 6 according to the first embodiment includes the cell C1, which is the first temporal-operator imparted region, in which the first temporal operator TO1 is imparted to the first program module RPM1 of the ladder program RP, in the first display area 62a1, which displays the ladder program RP that is the control specification descriptive expression. Further, the engineering tool 6 includes the cell C2, which is the second temporal-operator imparted region, in which the second temporal operator TO2 is imparted to the second program module RPM2, the second temporal operator TO2 being different from the first temporal operator TO1. Thus, the engineering tool 6 can impart various temporal operators TO to the ladder program RP that is the control specification descriptive expression.

Further, with the engineering tool 6, the ladder program RP that is the control specification descriptive expression defines the control specification of the control-target devices 2, 3, and 4. Thus, the engineering tool 6 can easily input the control specification of the control-target devices 2, 3, and 4 by using the ladder program RP that is the control specification descriptive expression, to which the temporal operators TO can be imparted. Therefore, the engineering tool 6 can easily perform the operation check on the SFC program SP.

Further, the engineering tool 6 according to the first embodiment includes the control specification editing unit 11, which creates the first program module RPM1 and the second program module RPM2; and the control-specification-descriptive-expression converting unit 13, which converts the first program module RPM1 and the second program module RPM2 into mathematical expressions NF, which can be input to the model checking program MP. Thus, the engineering tool 6 can input the ladder program RP created by using the control specification editing unit 11 to the model checking program MP without a special operation by the user. Therefore, by using the ladder program RP, the engineering tool 6 can easily input the control specification of the control-target devices 2, 3, and 4.

The engineering tool 6 according to the first embodiment includes the program editing unit 12, which creates the SFC program SP, which is the control program to control the control-target devices 2, 3, and 4; and the state transition model converting unit 14, which converts the SFC program SP into the state transition model JM, which is a code that can be input to the model checking program MP. Thus, the engineering tool 6 can input the SFC program SP created using the program editing unit 12 to the model checking program MP without a special operation by the user.

Further, the engineering tool 6 according to the first embodiment includes the program editing unit 12, which creates the SFC program SP, which is the control program to control the control-target devices 2, 3, and 4, and the second display areas 62a2, which are displayed on the display screen 62a of the display device 62 and display the SFC programs SP. Thus, the engineering tool 6 can create the SFC programs SP while the user checks the second display areas 62a2.

Further, the engineering tool 6 according to the first embodiment uses the ladder program RP as the control specification descriptive expression. Each conditional part of the ladder program RP can be converted into a single logical expression, i.e., a single temporal operator. Thus, the engineering tool 6 can impart any temporal operator TO to any position in the program module RPM of the ladder program RP that is the control specification descriptive expression and can impart various temporal operators TO to the ladder program RP that is the control specification descriptive expression.

The configuration illustrated in the above embodiment illustrates an example of the content of the present invention and can be combined with other publicly known techniques, and part of the configuration can be omitted or changed without departing from the spirit of the invention.

REFERENCE SIGNS LIST 2, 3, 4 control-target device, 6 engineering tool, 11 control specification editing unit (first creating unit), 12 program editing unit (second creating unit), 13 control-specification-descriptive-expression converting unit (first converting unit), 14 state transition model converting unit (second converting unit), 62 display device 62a display screen, 62a1 first display area, 62a2 second display area, RP ladder program (control specification descriptive expression), RPM1 first program module, RPM2 second program module, TO1 first temporal operator, TO2 second temporal operator, C1 cell (first temporal-operator imparted region), C2 cell (second temporal-operator imparted region), SP SFC program (control program), NF mathematical expression, JM state transition model (code), MP model checking program.

The invention claimed is:

1. An engineering tool comprising:
a display device comprising a display screen, the display screen comprising a first display area configured to display a control specification descriptive expression that defines operations of an industrial hardware device and a second display area configured to display a control program used to control the industrial hardware device;
a temporal-operator imparted region configured to impart a temporal operator to a program module of the control specification descriptive expression, the temporal-operator imparted region being displayed in the first display area;
a processor configured to execute a program; and
a memory configured to store the program which, when executed by the processor, causes the processor to perform processes of:
receiving user input, generating the program module based on the user input, and displaying the program module in the first display area;
receiving additional user input, generating the control program based on the additional user input, and displaying the control program in the second display area;
checking whether the control program complies with the program module; and
in response to determining that the control program complies with the program module, transmitting the control program to a control device to thereby control physical operations of the industrial hardware device based on the control program.

2. The engineering tool according to claim 1, wherein:
the program, when executed by the processor, causes the processor to further perform a process of:
converting the program module into a mathematical expression that is allowed to be input to a model checking program.

3. The engineering tool according to claim 2, wherein the program, when executed by the processor, causes the processor to further perform a process of:
converting the control program into a code that is allowed to be input to the model checking program.

4. The engineering tool according to claim 3, wherein the program module defines a control specification of the industrial hardware device.

* * * * *